(12) United States Patent
Jorgensen et al.

(10) Patent No.: US 12,716,398 B2
(45) Date of Patent: Aug. 25, 2026

(54) BLADE ASSEMBLY FOR A WIND TURBINE BLADE, WIND TURBINE AND METHOD FOR BUILDING A WIND TURBINE BLADE

(71) Applicant: LM Wind Power A/S, Kolding (DK)

(72) Inventors: Jeppe Bjorn Jorgensen, Kolding (DK); Kiran Manikarnika, Kolding (DK)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 18/997,312

(22) PCT Filed: Jul. 20, 2023

(86) PCT No.: PCT/EP2023/070194
§ 371 (c)(1),
(2) Date: Jan. 21, 2025

(87) PCT Pub. No.: WO2024/018019
PCT Pub. Date: Jan. 25, 2024

(65) Prior Publication Data

US 2026/0028960 A1 Jan. 29, 2026

(30) Foreign Application Priority Data

Jul. 22, 2022 (EP) .................................... 22186515

(51) Int. Cl.
*F03D 1/06* (2006.01)

(52) U.S. Cl.
CPC ........ *F03D 1/0675* (2013.01); *F05B 2230/23* (2013.01)

(58) Field of Classification Search
CPC .... F03D 1/0675; F03D 1/0677; F03D 1/0679; F03D 1/0681; F03D 1/0684;
(Continued)

(56) References Cited

U.S. PATENT DOCUMENTS

2017/0002792 A1 1/2017 Yarbrough et al.

FOREIGN PATENT DOCUMENTS

EP 2682537 A1 * 1/2014 ............. B32B 21/04
EP 3086924 A1 11/2016
(Continued)

OTHER PUBLICATIONS

Machine translation of EP-2682537-A1, published Jan. 8, 2014 (Year: 2014).*
(Continued)

*Primary Examiner* — Nathaniel E Wiehe
*Assistant Examiner* — Jason G Davis
(74) *Attorney, Agent, or Firm* — Dority & Manning, P.A.

(57) ABSTRACT

A blade shell assembly for a wind turbine blade shell is described. The blade shell assembly includes a first element (200) having a first mating surface (201) and a second element (300) having a second mating surface (301). The first mating surface (201) and the second mating surface (301) are adapted for abutting on each other in an assembled state. The second element (300) includes one or more grooves (310) able to generate a spring effect to close a gap (450) between the first element (200) and the second element (300), the gap (450) extending substantially in a direction (402) substantially perpendicular to the second mating surface (301) or the first mating surface (201). Further, a method for building a blade shell of a wind turbine blade and a wind turbine blade are described.

8 Claims, 5 Drawing Sheets

(58) Field of Classification Search
CPC .... F03D 1/0685; F03D 1/0687; F03D 1/0688; F03D 1/069; F03D 80/301; F05B 2230/23
See application file for complete search history.

(56) References Cited

FOREIGN PATENT DOCUMENTS

| | | | | | |
|---|---|---|---|---|---|
| EP | 3501808 | A1 | | 6/2019 | |
| EP | 2855130 | B1 | | 8/2019 | |
| EP | 2682537 | B1 | | 1/2020 | |
| EP | 3623614 | A1 | | 3/2020 | |
| EP | 3501810 | B1 | | 6/2022 | |
| WO | WO-2021228338 | A1 | * | 11/2021 | ......... B29D 99/0028 |

OTHER PUBLICATIONS

European Search Report Corresponding to EP22186515 on Dec. 19, 2022.
PCT International Search Report Corresponding to PCT/EP2023/070194 on Sep. 26, 2023.

* cited by examiner

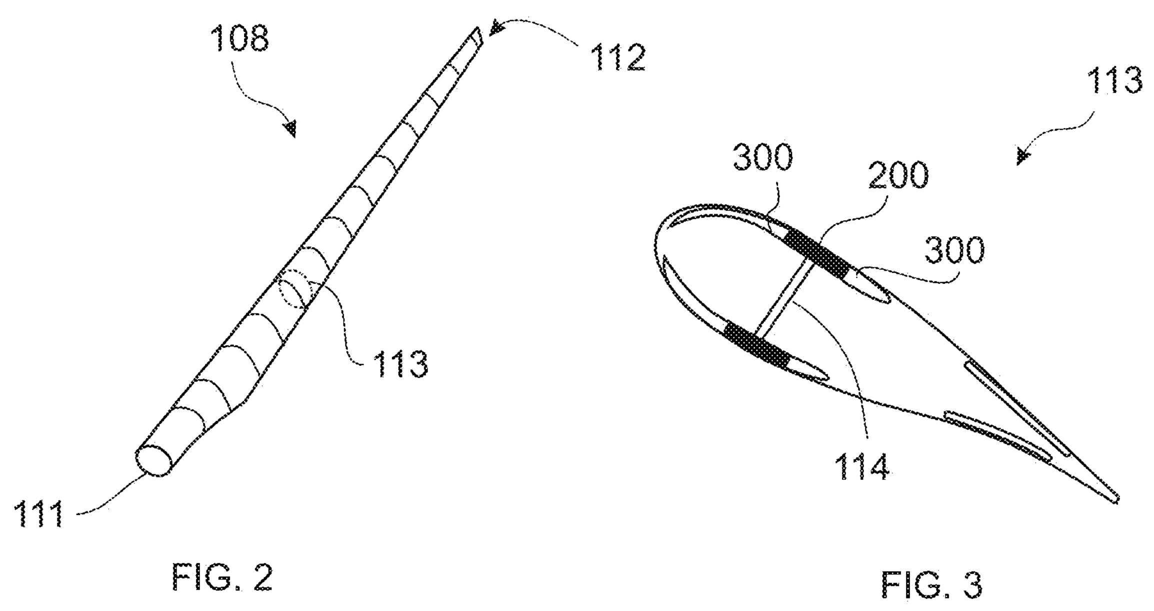
FIG. 2
FIG. 3
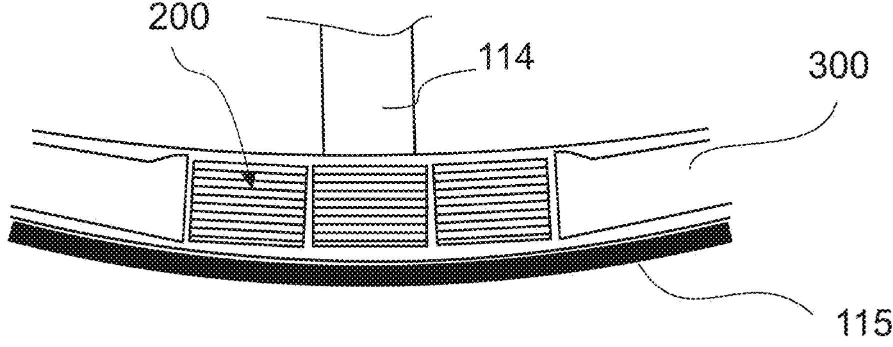
FIG. 4

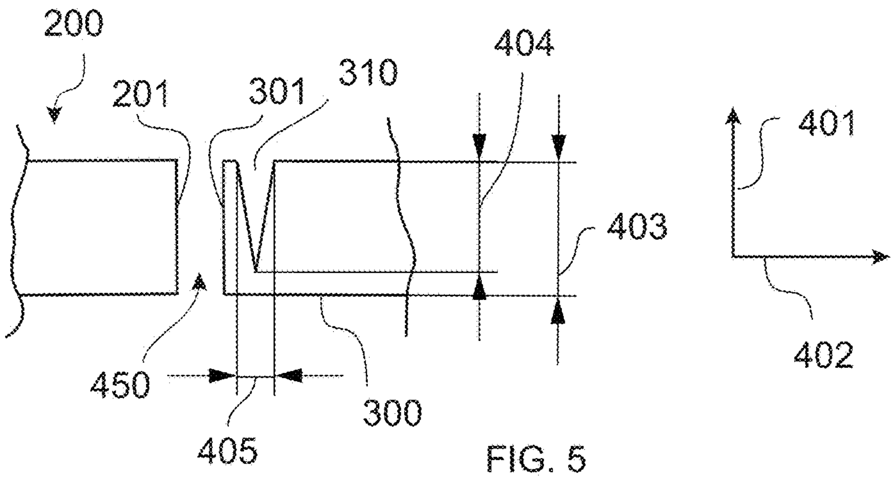
FIG. 5
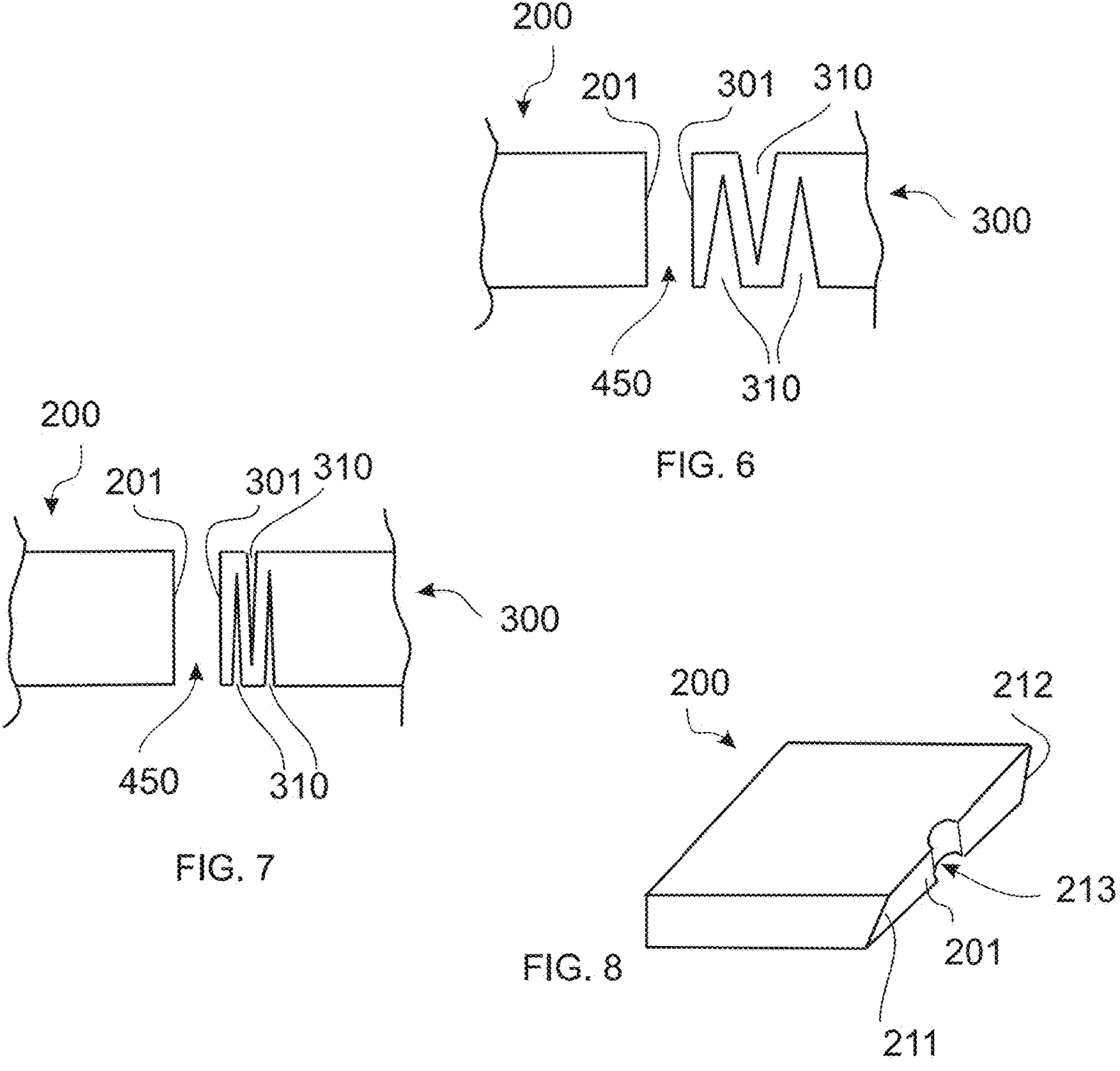
FIG. 6
FIG. 7
FIG. 8

BLADE ASSEMBLY FOR A WIND TURBINE BLADE, WIND TURBINE AND METHOD FOR BUILDING A WIND TURBINE BLADE

RELATED APPLICATIONS

The present application claims priority to PCT Application No. PCT/EP2023/070194, filed Jul. 20, 2023, which claims the benefit of European Patent Application No. 22186515.7 filed Jul. 22, 2022. Both applications are incorporated by reference in their entirety.

FIELD

The present subject matter relates generally to a method for building a wind turbine blade, a blade shell assembly for building a wind turbine blade, and a wind turbine blade. In particular, the present subject-matter relates to a method for building a wind turbine blade having several elements, a blade shell assembly having several elements, and a wind turbine blade including the blade shell assembly.

BACKGROUND

Wind power is considered one of the cleanest, most environmentally friendly energy sources presently available, and wind turbines have gained increased attention in this regard. A modern wind turbine typically includes a tower, generator, gearbox, nacelle, and a rotor with one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The blades of a wind turbine are carefully designed and often have a complex shape to increase the efficiency of the wind turbine. When producing the blades of a wind turbine, various materials are used. For instance, different materials may be used within one blade for taking into consideration different load cases along the blade length. Between two adjacent materials used for one blade, there is a transition between two different elements of the blade shell.

However, the geometry of a wind turbine blade is sensitive with respect to deviations, such as a gap or a height difference. For instance, transitions between different elements of a blade shell may lead to irregularities on the surface of the wind turbine blade. Irregularities on the surface of a wind turbine blade may lead to a modified contact between blade surface and wind, which may—in turn—influence the energy yield of the wind turbine. Also, irregularities may lead to premature wear and damage on the wind turbine blade. Repairing premature wear and damage are cost intensive.

Accordingly, the present disclosure provides a method for building a wind turbine blade shell, a blade shell assembly for a wind turbine blade shell, and a wind turbine blade according to the independent claims.

BRIEF DESCRIPTION

Aspects and advantages of the invention will be set forth in part in the following description, or may be obvious from the description, or may be learned through practice of the invention.

In one aspect, the present disclosure is directed to a method for building a wind turbine blade shell including a first element and a second element. The first element has a first mating surface and the second element has a second mating surface. The method includes forming one or more grooves into the second element, wherein the one or more grooves in the second element are able to generate a spring effect for the second element substantially in a direction (typically denoted as second direction) being substantially perpendicular to the second mating surface: placing the first element and the second element adjacent to each other with the first mating surface of the first element and the second mating surface of the second element facing each other; and closing a gap between the first element and the second element in the direction being substantially perpendicular to the second mating surface by pressing the first mating surface and the second mating surface together.

Generally, there is a tolerance range for the size of the gap. However, the gaps between two elements of a wind turbine shell are hard to measure and to identify as the gap can (only) be seen from the top (which makes it difficult to complete quality checks). Not identifying gaps may lead to problems with the blade, such as curing cracks in brittle polyester resin, wrinkles of skin layers of the blade, or time-consuming repair works.

Accordingly, the method for building a blade shell of a wind turbine according to embodiments described herein allows for eliminating a gap between the first element and the second element of a blade shell. Especially, the gap is eliminated in an easy and uncomplicated way, which does not use additional process steps, as known in the art, such as using filling material in the gap, or the like.

For instance, if polyester resin is used to fill bigger gaps (as done in known production methods), then the polyester resin is prone to cracking due to curing residual stresses. When polyester resin shrinks, but is constrained by rigid elements of the blade shell, the polyester resin is not able to contract. Instead the polyester resin will crack. The bigger the gap, the more the polyester resin will crack.

Embodiments of the present application refer to eliminating the gap from the beginning. For instance, the formation of the elements is chosen so that a gap between two elements of the wind turbine blade can be avoided. Having avoided or eliminated the gap before the resin application leads to a smooth surface of the blade shell, and the blade in general. A smooth blade surface in turn helps increasing the energy yield of the wind turbine as well as the lifetime of the wind turbine.

In one aspect, the present disclosure is directed to a blade shell assembly for a wind turbine blade shell. The blade shell assembly includes a first element having a first mating surface and a second element having a second mating surface. The first mating surface and the second mating surface are adapted for abutting on each other in an assembled state. The second element includes one or more grooves able to generate a spring effect to close a gap between the first element and the second element, the gap extending substantially perpendicular to the first mating surface and/or the second mating surface.

In one aspect, the present disclosure is directed to a wind turbine comprising a blade assembly according to embodiments described herein.

The blade shell assembly as well as the wind turbine blade including the blade shell assembly according to embodiments described herein offer an easy and cost-conscious way to provide a wind turbine blade having a smooth surface substantially without cracks and wrinkles appearing due to a gap between elements of the wind turbine blade shell. By providing a second element of the elements of a wind turbine blade according to embodiments described herein, a gap between the elements can be avoided or eliminated from the beginning, especially before the elements are infused with resin or the like for building the wind turbine blade.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 illustrates a schematic perspective view of a wind turbine blade according to embodiments of the present disclosure;

FIG. 3 illustrates a schematic cross-sectional view of a wind turbine blade according to embodiments of the present disclosure;

FIG. 4 illustrates details of a schematic cross-sectional view of elements of a wind turbine blade according to embodiments of the present disclosure;

FIGS. 5 to 12 illustrate schematic views of a first element and a second element of a wind turbine blade according to embodiments of the present disclosure.

Single features depicted in the figures are shown relatively with regards to each other and therefore are not necessarily to scale. Similar or same elements in the figures, even if displayed in different embodiments, are represented with the same reference numbers.

DETAILED DESCRIPTION OF THE INVENTION

Figure 1:
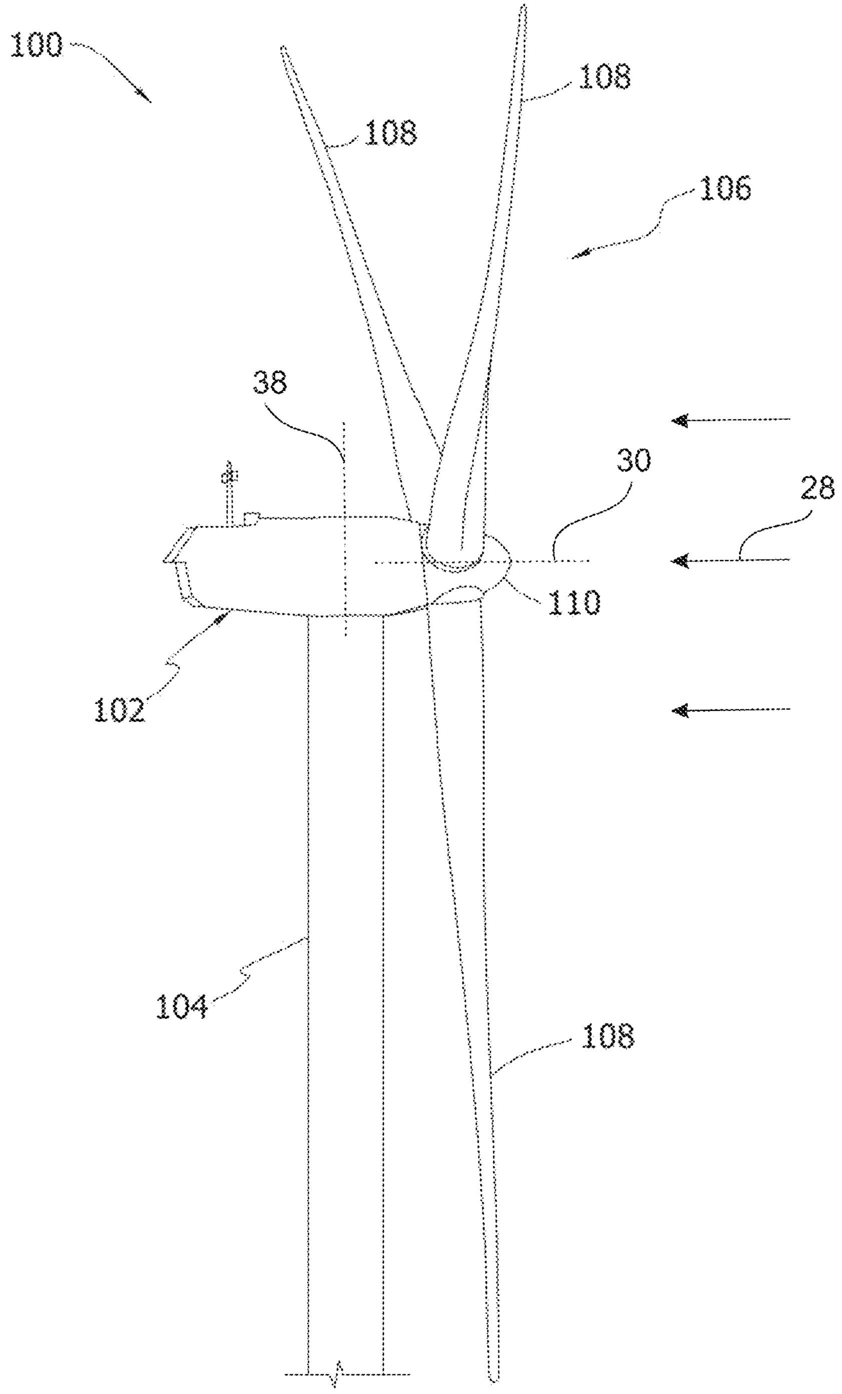
FIG. 1 illustrates a perspective view of a wind turbine according to an embodiment of the present disclosure.

Reference now will be made in detail to embodiments of the invention, one or more examples of which are illustrated in the drawings. Each example is provided by way of explanation of the invention, which shall not limit the invention. In fact, it will be apparent to those skilled in the art that various modifications and variations can be made in the present invention without departing from the scope or spirit of the invention, for instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a portion of an exemplary wind turbine 100. In the exemplary embodiment, the wind turbine 100 is a horizontal-axis wind turbine. Alternatively, the wind turbine 100 may be a vertical-axis wind turbine. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three wind turbine blades 108 attached to a rotating hub 110. In the following, the wind turbine blades are also referred to as wind turbine rotor blades, and rotor blades for short. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (also not shown in FIG. 1).

The rotor blades 108 are spaced about the hub 110 to facilitate rotating the rotor 106 to enable kinetic energy to be transferred from the wind into usable mechanical energy, and subsequently, electrical energy.

In one embodiment, the rotor blades 108 have a length ranging from about 15 meters (m) to about 130 m. Alternatively, rotor blades 108 may have any suitable length that enables the wind turbine 100 to function as described herein. For example, other non-limiting examples of blade lengths include 20 m or less, 37 m, 48.7 m, 50.2 m, 52.2 m or a length that is greater than 91 m, such as 100 m and more.

According to embodiments described herein, each rotor blade comprises a wind turbine blade shell.

The term "wind turbine blade shell" as used herein may be understood as the shell of a wind turbine blade. In particular, the shell of the wind turbine blade may be described as the exterior side or the outer side of a wind turbine blade. According to some embodiments, the shell of a wind turbine blade may be the surface of the wind turbine blade, which is hit by the wind and other environmental influences, such as the weather conditions. In some embodiments, the shell of the wind turbine blade may be described as a kind of skin of the wind turbine blade. Especially, the shell of the wind turbine blade may aerodynamically be formed, in particular for adapting the blade shell for an efficient energy yield. In some embodiments, the shell of a wind turbine blade may be adapted for withstanding the own load as well as the forces of wind and weather acting on the wind turbine blade. According to some embodiments, the shell of the wind turbine blade may surround other elements of the wind turbine blade, such as reinforcing elements, shaping elements, load carrying elements, and the like.

As wind strikes the rotor blades 100 from a wind direction 28, the rotor 106 is rotated about an axis of rotation 30. As the rotor blades 108 are rotated and subjected to centrifugal forces, the rotor blades 108 are also subjected to various forces and moments. As such, the rotor blades 108 may deflect and/or rotate from a neutral, or non-deflected, position to a deflected position.

Moreover, a pitch angle of the rotor blades 108, i.e., an angle that determines a perspective of the rotor blades 108 with respect to the wind direction, may be changed by a pitch system to control the load and power generated by the wind turbine 100 by adjusting an angular position of at least one rotor blade 108 relative to wind vectors. During operation of the wind turbine 100, the pitch system may change a pitch angle of the rotor blades 108 such that the rotor blades 108 are moved to a feathered position, such that the perspective of at least one rotor blade 108 relative to wind vectors provides a minimal surface area of the rotor blade 108 to be oriented towards the wind vectors, which facilitates reducing a rotational speed and/or facilitates a stall of the rotor 106.

A blade pitch of each rotor blade 108 may be controlled individually by a wind turbine controller or by a pitch control system. Alternatively, the blade pitch for all rotor blades 108 may be controlled simultaneously by said control systems.

Further, in the exemplary embodiment, as the wind direction 28 changes, a yaw direction of the nacelle 102 may be rotated, by a yaw system, about a yaw axis 38 to position the rotor 106 with respect to wind direction 28.

The yaw system may include a yaw drive mechanism provided by nacelle 102.

Further, yaw system may also be controlled by wind turbine controller.

For positioning nacelle 102 appropriately with respect to the wind direction 28 as well as detecting a wind speed, the nacelle 102 may also include at least one meteorological mast that may include a wind vane and anemometer. The mast 107 may provide information to the wind turbine controller regarding ambient conditions. This may include wind direction and/or wind speed as well as ambient temperature, ambient moisture, precipitation type and/or amount (if any).

FIG. 2 shows a perspective view of a single rotor blade 108 or single wind turbine blade 108 according to embodiments described herein. Typically, the rotor blade 108 or wind turbine blade extends from root 111 to tip 112. The shape of the rotor blade 108 is roughly indicated in FIG. 2 by the lines running across the width of the rotor blade. An example of a cross-section 113 of the turbine blade 108 is drawn in FIG. 3.

The cross-section 113 according to some embodiments described herein is shown in detail in FIG. 3. Typically, the cross-section 113 of a wind turbine blade 108 has a defined shape for reaching an optimized result for energy yield. The example of a cross-section 113 of a wind turbine blade 108 of FIG. 3 shows parts of a blade shell according to some embodiments described herein. In particular, in the example of a cross-section 113 shown in FIG. 3, the blade shell includes a first element 200 and a second element 300.

According to some embodiments, the first element 200 may be a load carrying element of the turbine blade. In particular, the first element may be denoted as a main spar element of a wind turbine blade. For instance, the first element 200 as described in embodiments herein may be formed as a stack of layers of one or more materials. In one example, the first element 200 may be a stack of layers of carbon material, in particular, a stack of layers of pultruded carbon material. In some embodiments, the first element 200 may be denoted as being made by carbon pultrusion. According to some embodiments, the first element 200 may include interlayers between the layers of carbon material. In particular, the interlayers may include an infusion material being placed between the layers of carbon material. According to some embodiments, which may be combined with other embodiments described herein, the infusion material may include a resin, such as vinyl ester, epoxy, and/or polyurethane. According to some embodiments, the first element may also be denoted as spar cap for a wind turbine blade.

The second element 300 of the blade shell of the wind turbine blade 108 according to some embodiments described herein is also shown in FIG. 3. Typically, the second element 300 is arranged adjacent to the first element 200. In particular, the second element 300 is arranged abutting, or substantially abutting against the first element 200. According to some embodiments, the second element 300 may be a core element or a core material for a wind turbine blade. Especially, the second element 300 may be at least one of a substantially continuous material, a substantially rigid material, and a substantially non-permeable material in some embodiments. According to some embodiments, a continuous material may be understood as a material substantially without regularly appearing holes in it, or without regularly appearing pores. According to some embodiments, a rigid material may be understood as a material, which is able to keep the form of a wind turbine blade shell under conditions of operation of a wind turbine, especially at a wind turbine site. According to some embodiments, a non-permeable material may be understood as a material, which is non-permeable for a resin, or may be understood as a material, which does not absorb resin, such as a resin used for forming the blade shell, as described in detail below.

In some embodiments, the second element may include one or more of the following materials: foam, balsa material, PET, especially PET foam, PVC, especially PVC foam, polyurethane, especially polyurethane foam, MMA (methamethylacrylate), vinyl ester (especially type A), and polyurethane (PU).

As can be seen in the example of FIG. 3, further elements, e.g. further parts of the second element, may be part of the blade shell of the turbine blade 108 according to some embodiments. According to some embodiments, FIG. 3 also shows a shear web 114, especially for stabilizing the blade shell of the wind turbine blade.

FIG. 4 shows a more detailed view of a portion of the blade shell exemplarily shown in FIG. 3. The detailed view shows the first element 200 including several layers of a material, or especially several layers with interlayers in-between. Further, the detailed view of FIG. 4 shows the second element 300 arranged adjacently to the first element 200. Typically, the first element (e.g. the main spar element of the wind turbine blade) may be produced in an offline mold. In particular, the main spar may be produced by a stack of layers infused with vinyl ester resin. After production of the first element, the first element may be placed in a blade shell mold 115 according to some embodiments. Typically, the blade mold with the first and second element is infused with a material, such as a resin material, e.g. polyester, for forming the blade shell.

According to embodiments described herein, the core materials (examples of core materials may for example be balsa wood, PET foam, and/or PVC foam) of the second element 300 may be placed and, especially, butted up against the first element forming the main spar, as can be seen in FIG. 4. During the placement process of main spar and core materials (i.e. the first and second element), it has shown that it may be difficult to make the core materials fit to the (pultrusion) main spar. However, fitting elements of the blade shell result in a smooth transition. A misfit of the elements, such as main spar element and the core element may result in a gap and height step on the surface of the rotor blade. In turn, this may mean that there is no smooth transition. If there is a gap or height step exceeding a defined tolerance value (e.g. in the range of a few millimetre), the core to main spar transition may not be smooth enough for the reliable and effective operation of the wind turbine. In this case, a lot of rework may be needed (resulting in prolonged cycle time, and additional costs which is hardly acceptable).

According to some embodiments, the present disclosure offers a solution how the (offline produced) first element and the second element can be fit in an efficient and high-quality way. Typically, the solution according to embodiments described herein present an improvement of the core-to-main spar transition such that high quality is achieved, especially compared to known production techniques.

FIG. 5 shows an example of a fitting situation, when a first element 200 and a second element 300 are placed adjacent to each other. Typically, the first element 200 includes a first mating surface 201 and the second element 300 includes a second mating surface 301.

The term "mating surface" as used in embodiments described herein may be understood as a surface of an element, which may be brought in a mating condition with another mating surface of another element. More typically, the first mating surface and the second mating surface may be adapted for mating with each other. In particular, a mating surface as described herein may be understood as a surface, which is not yet in a mating condition with another mating surface, or a surface to be mated when assembling the elements, or a surface adapted to be mated in some embodiments. According to some embodiments, the mating surface may be adapted to be mated to another mating surface by the shape of the surface, the design of the surface, the surface properties (such as roughness, shape, porosity, or the like), the material of the surface, the orientation of the surface, and the like.

FIG. 5 shows the first mating surface 201 and the second mating surface 301 typically extending substantially in a first direction 401, as exemplarily shown in the coordinate system next to FIG. 5. According to some embodiments, which may be combined with other embodiments, the first direction 401 may run substantially in the vertical direction. In some embodiments, the first direction 401 may be inclined compared to the vertical direction.

The term "substantially" as used in embodiments described herein may be understood that there may be a certain deviation from the property denoted with "substantially." For instance, the orientation of a surface extending substantially in a first direction may include a deviation typically up to 15° from the first direction, more typically up to 10° from the first direction, and even more typically up to 5° from the first direction. According to some embodiments, the first mating surface and the second mating surface may have different deviations from the substantial first direction. According to some embodiments, the term "substantially perpendicular" may include a deviation up to 15° from the perpendicular direction, more typically up to 10° from the perpendicular direction, and even more typically up to 5° from the perpendicular direction. Accordingly, properties, which are not measured in degree and are described as being "substantially" may include a deviation of typically up to 15%, more typically up to 10%, and even more typically up to 5% from the described property.

Going back to FIG. 5, the first element 200 and the second element 300 as shown in FIG. 5 may be placed in a blade shell mold for forming the blade shell in some embodiments, as explained above. A gap 450 may appear between the first element 200 and the second element 300, e.g. due to fabrication tolerances, deviations in the size of the shell, temperature variations, material variations, and the like. Typically, the gap 450 may extend between the first mating surface 201 of the first element 200 and the second mating surface 301 of the second element 300. According to embodiments described herein, the gap 450 may extend between the first mating surface and the second mating surface (in an un-assembled stage) and may run substantially perpendicular to the first mating surface and/or the second mating surface. In some embodiments, the size of the gap may typically be measured in a second direction 402, which may be substantially perpendicular to the first direction 401, as exemplarily shown in the coordinate system next to FIG. 5. In some embodiments, the second direction 402 may substantially extend in a horizontal direction. According to some embodiments, the second direction 402 is a direction being substantially perpendicular to the second mating surface of the second element 300.

In some embodiments, the gap may typically have a width in the second direction 402 of between about 0.1 mm and about 10 mm, more typically between about 0.5 mm and about 7 mm, and even more typically between about 1 mm and about 5 mm. According to some embodiments, a gap greater than 2 mm or 3 mm may be avoided.

FIG. 5 shows the second element 300 including a groove 310 according to embodiments described herein. Typically, the second element 300 includes at least one groove. More typically, the second element includes two or more grooves. In some embodiments, the number of grooves in the second element 300 may typically be between 1 and 15, more typically between 1 and 10, and even more typically between 2 and 8. FIG. 6 shows an example, in which three grooves 310 are formed in the second element 300.

The term "groove" as used herein may be understood as a cut-out or a slit within an element of a wind turbine blade. According to some embodiments, a groove may also be denoted as a recess, a notch, a slot, or a kerf. In some embodiments, a groove as described herein may have a defined orientation, shape and size. Typically, the orientation of a groove may be measured along a direction of the largest expansion of the groove. For instance, the orientation of a groove having an elongated shape may be measured along the longitudinal direction of the groove. According to some embodiments, the defined (and limited) size of a groove as described herein may depend on the size of the element, in which the groove is located. According to some embodiments, the shape of a groove as described herein may be chosen according to the purpose of the groove, the element, in which the groove is located, especially the shape of the element, in which the groove is located, the material of the element, in which the groove is located, production considerations, and the like. For instance, a groove as described herein may have any geometrical shape, such as a substantially triangular shape, a substantially quadrangular shape, a substantially polygonal shape, a shape with or without rounded corners, a substantially round shape, a shape representing a divided circle, a divided ellipse, a shape including straight lines, or a shape including a combination of the aforementioned geometries, or the like.

FIG. 5 shows an embodiment, in which the groove is formed from top towards the bottom of the second element 300 (when seen in the orientation exemplarily shown in FIG. 5). In some embodiments, the groove(s) in the second element 300 may be formed from the bottom towards the top of the second element. According to some embodiments, in which the second element includes more than one groove, the orientation of the grooves may vary. FIG. 6 shows an embodiment of a second element 300 having three grooves 310. In the example of FIG. 6, one groove extends from top towards the bottom, and two grooves extend from bottom towards the top. According to some embodiments, the orientation of the grooves may vary as suitable for the intended use and may be chosen accordingly without being limited to the examples shown in the figures and described in detail in the present disclosure.

As mentioned above, the one or more grooves may have a defined size. Typically, the one or more grooves 310 of the second element 300 have a defined size in the first direction 401 and the second direction 402. For instance, FIG. 5 shows the size of a groove 310 in the first direction as first direction size 404. Typically, the size of the groove may be measured from the surface of the second element 300, in which the groove is formed, to the bottom or end of the groove 310. According to some embodiments, the first direction size 404 of a groove described herein may typically extend over at least 50%, more typically at least 65%, and even more typically at last 90% of the height 403 of the second element 300 in the first direction 401. In some embodiments, the first direction size 404 of a groove described herein may typically extend over about 80% of the height 403 of the second element 300 in the first direction 401.

According to some embodiments, which may be combined with other embodiments described herein, the groove 310 may have a second direction size 405 extending in the second direction 402 as exemplarily shown in FIG. 5. Typically, the second direction size of the groove 310 may be measured on the surface of the second element, in which the groove is formed. Typically, the second direction size 405 of the groove 310 may extend in width direction of the second element, which may correspond to the second direction 402 according to some embodiments described herein. In some embodiments, the size in the second direction 402 of the groove 310 may vary (such as increasing or decreasing) along the extension of the groove 310 in the first direction 401. For instance, the size of the groove 310 in the second direction 402 decreases along the first direction size 404 of the groove 310. According to some embodiments, the second direction size 405 of the groove may typically be between about 5% and about 70%, more typically between about 10% and about 60%, and even more typically between about 20% and about 50% of the first direction size 404 of the groove 310. In some embodiments, the second direction size 405 of the groove may typically be between about 15% and about 30% of the first direction size 404 of the groove 310. According to some embodiments, the groove shown in FIG. 5 may be denoted as having a tapering shape.

FIG. 7 shows an embodiment of the first element 200 and the second element 300, where the second element 300 has three grooves 310 formed in the second element 300. According to some embodiments described herein, which may be combined with other embodiments described herein, the grooves 310 in FIG. 7 are narrower compared to the grooves of FIG. 6. For instance, the grooves 310 shown in FIG. 7 have a smaller ratio of second direction size to first direction size, especially when compared to the grooves shown in the embodiments of FIG. 5 and FIG. 6.

According to embodiments described herein, the one or more grooves are able to generate a spring effect in the second element.

The term "spring effect" as used herein may be understood as an effect causing an object or element to act (at least partially) like a spring, especially when subjected to compression or tension. Especially, the spring effect generated for an element according to embodiments described herein may cause the element to store mechanical energy. Typically, the element able to store mechanical energy includes elastic properties. According to some embodiments, elastic properties of the element, for which the spring effect is generated, may be realized by geometric features or material properties, or both. According to embodiments described herein, the spring effect is generated and enabled by defined geometric features, such as a groove, a cut-out, a recess, a notch, a slot, a kerf, or the like. For instance, if an element having a groove formed in it, is compressed or stretched from a resting position (i.e. a position, in which no forces act on the element), the element exerts an opposing force. In some embodiments, the second element may (additionally to the geometric features generating the spring effect) be made from an elastic material allowing an easier compression of the element.

According to some embodiments, the spring effect as described herein may be a spring effect in a defined direction. For instance, the force exerted by an element having a spring effect may be directed in a defined direction. According to embodiments described herein, the defined direction of the spring effect may depend on the geometry of the element providing the spring effect and/or on the material of the element providing the spring effect.

According to some embodiments, the grooves in the second element being able to generate a spring effect may be understood in that the grooves enable the second element (or a part of the second element) acting as a spring-like element.

According to some embodiments, which may be combined with other embodiments described herein, the one or more grooves provide a local softening effect on the core material. A local softening effect may be described as an effect being present in a part of the core material, in which the one or more grooves are located. Typically, the one or more grooves may provide a locally lower spring stiffness of the (optionally elastic) core material. Accordingly, the core material is able to fit the shape of the spar cap, especially substantially regardless of spar cap manufacturing variations or core material variations along the blade span.

Typically, the spring effect generated or enabled by the one or more grooves in the second element is present (only) during assembly of the blade shell. Once the blade shell is completed (or once the different elements of the blade shell are infused with a resin, for example), the second element may not be able to provide a spring effect anymore (or to a widely reduced extent). For instance, the elements of the blade shell may be fixed in a defined position (e.g. a position, in which the gap between the elements is considerable reduced or even eliminated). It may be understood that the resin infused in a blade shell mold (as explained in detail below) may be a kind of fixture of the present position of the elements. A further movement (such as a drift) of the single elements relative to each other is widely prevented, once the resin is cured.

Typically, the first element 200 and the second element 300 may be placed adjacent to each other (e.g. in a blade shell mold) and the mating surfaces of the respective elements may be brought in contact to each other (as far as possible). Typically, the first and second element may be pressed towards each other, e.g. when placed in a blade shell mold for bringing the mating surfaces in contact with each other. When the compression force applied during montage of the first and the second element is diminished, the mating surfaces of the first and second element may drift apart, e.g. due to unplanned present space provided by production tolerances of the elements, production tolerances of the blade shell mold, temperature conditions, lacking surface adhesion, and the like. When the mating surfaces of the first and second elements drift apart, the gap may appear when using known production techniques, which has the above described effects on the wind turbine shell. The second element having one or more grooves according to embodiments described herein allows for filling the gap with the second element by offering flexibility regarding the extension of the second element in the second direction. For instance, the spring effect generated by the one or more grooves in the second element yields a wide range of extension of the second element in the second direction. By using the second element according to embodiments described herein, the spring provided by the one or more grooves in the second element is able to exert a force, which avoids a gap to appear or remain. Especially, the second element may be adapted so that an expansion of the second element (e.g. after having been compressed) may fill a gap between the first element and the second element.

According to some embodiments, the second element having one or more grooves according to embodiments described herein offers a greater flexibility for the first and second element to be produced. For instance, the width of the first element and the second element in the second direction may be chosen within a much wider range (compared to known elements) without risking a gap to appear or remain. In this way, the production of the elements may be facilitated and, thus, may be less cost intensive. Avoiding a gap to appear or remain also avoids subsequent machining, and leads to a less expensive after-production work. Typically, having no gap between the elements of the blade shell with the method and assembly according to embodiments described herein does not only reduce production costs, but also leads to a greater energy yield during operation of the wind turbine.

As exemplarily shown in FIGS. 5, 6, and 7 (and some other figures, too) the mating surface 201 is drawn as being substantially perpendicular to a mold surface 115 (or extending substantially in the first direction). According to some embodiments, which may be combined with other embodiments described herein, the mating surface 201 may not be substantially perpendicular to the mold surface, but may especially be inclined by some degrees. Typically, there may be a positive draft of a few degrees of the mating surface 201 to ensure that the spar cap can be demolded. Typically, the angle may vary along the length or span of the blade since the main spar elements (typically made from square-shaped pultrusion material) may be put into a curved mold surface. The local softening effect (or the effect of the grooves creating a lower spring stiffness, as explained above) of the one or more grooves in the core material enables a better core-to-main spar fit along the span of the blade (especially with inclined mating surfaces). Additionally, geometric variations of the spar cap geometry induced by local manufacturing may be taken up and accounted for by the local softening of the core material (especially the locally lower spring stiffness of the core material).

FIG. 8 shows an example of a main spar element having a mating surface 201 being inclined compared to the orientation perpendicular to a mold surface by some degrees (such as typically between about 1° and about 20°, more typically between about 2° and about 15°, and even more typically between about 2° and about) 10°. In other words, the first direction, along which the first mating surface 201 may substantially extend, deviates from the perpendicular orientation to the mold surface in FIG. 8. According to some embodiments, the main spar element 200 shown in FIG. 8 provides a change of the angle of the mating surface 201. Typically, the angle of the surface 201 being inclined may change from a first end 211 to a second end 212. Typically, the change in the angle may run over the length or span of the blade.

The embodiment of the spar cap element 200 shown in FIG. 8 shows a local variation 213 in the spar cap geometry (e.g. due to manufacturing variations).

Figure 9:
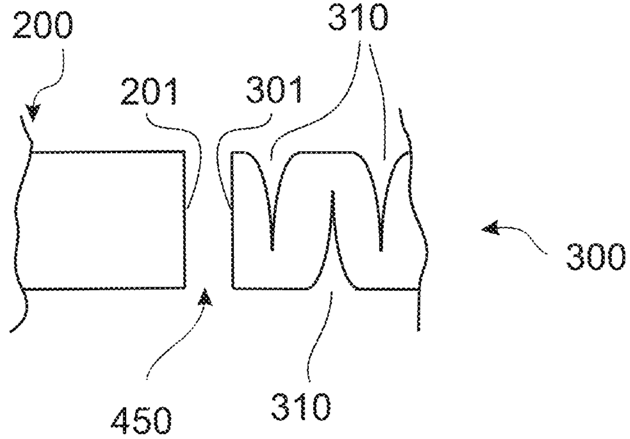

FIG. 9 shows an embodiment of the second element in which the grooves have another shape compared to FIGS. 5 to 7. Typically, the grooves 310 (or cut-outs) in FIG. 9 have a bent shape or the walls of the grooves 310 have a curvature. More typically, the curvature of the walls of the groove is formed so that the grooves are substantially pointed at the end. According to some embodiments, the material of the second element around the grooves may be denoted as having a substantially meandering shape. Generally, the shape of the one or more grooves may influence the stiffness of the spring effect generated by the one or more grooves in the second element.

Figure 10:
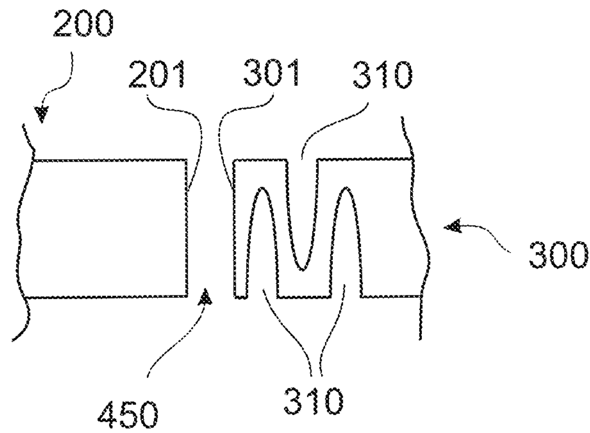

FIG. 10 shows an embodiment of a second element having grooves 310 having substantially the shape of a part of an ellipse, or a curvature leading to a rounded end of the groove.

Figure 11:
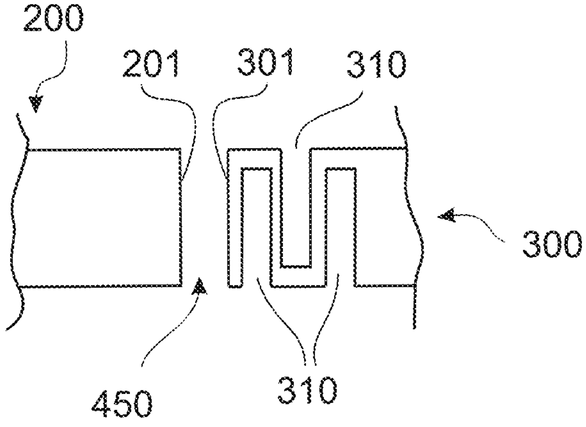

FIG. 11 shows an embodiment of a second element having grooves 310 having a substantially rectangular shape, or the shape of an open quadrangle.

Figure 12:
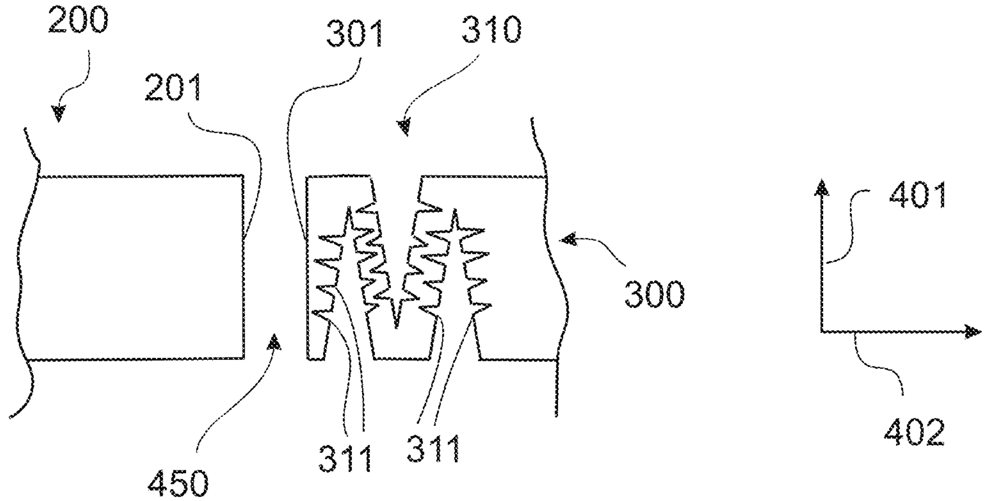

FIG. 12 shows an embodiment, which may be combined with other embodiments described herein. In the embodiment of a first element 200 and a second element 300 shown in FIG. 12, three grooves 310 are exemplarily shown as in other embodiments described herein. Additionally, the second element 300 of FIG. 12 provides cross-directional grooves 311.

According to some embodiments described herein, the term “cross-directional groove” may be understood as a groove running in a direction different from the direction of grooves 310. For instance, the longitudinal extension of the grooves 310 in FIG. 12 substantially runs in the first direction 401 and the longitudinal extension of the cross-directional grooves 311 in FIG. 12 substantially runs in the second direction 402. Although the cross-directional grooves 311 may be denoted as being “cross-directional” compared to the grooves 310, the angle between the longitudinal directions of the grooves 310 and the cross-directional grooves 311 may be arbitrarily chosen, e.g. according to the goal of the grooves, or production parameters. In some embodiments, grooves 310 may be denoted as main grooves 310 compared to the cross-directional grooves 311. For instance, the main grooves 310 may have a greater dimension than the cross-directional grooves 311 (e.g. measured in the longitudinal direction of the grooves, respectively). In some embodiments, the cross-directional grooves 311 may be located within a section of the second element 300, in which the main grooves 310 are located. According to some embodiments, the cross-directional grooves 311 may be formed within the walls of the main grooves 310. According to some embodiments, the grooves as described herein may be able to address and especially balance a height difference between the main spar element and the core element, typically in addition to filling the gaps in the second direction 402 (as described in detail above). In some embodiments, the cross-directional grooves 311 may be designed to allow for addressing a possible height difference between the first element 200 and the second element 300.

Although FIGS. 9 to 12 each show three (main) grooves 310 having an alternate orientation (e.g. beginning at the top surface of the second element or the bottom surface of the second element), it may be understood that the shapes of the grooves of the figures is not limited to the combination exemplarily shown in the figures. Rather, every shape of the groove may appear in an arbitrary number, and in every orientation (the orientation typically including the beginning at the top or bottom surface of the second element as well as the angle of the longitudinal direction of the respective groove). It may even be possible to combine different shapes and sizes of grooves in one single element. According to some embodiments, the size of main and cross-directional grooves may be uniform or non-uniform. For instance, the size of the grooves as described herein may vary within the second element. In some specific embodiments, there may be smaller dimension grooves in the same direction as the main grooves.

Generally, the shape of the one or more grooves in the second element is not limited to the shapes exemplarily shown in the figures. Further (and especially arbitrary) shapes of grooves may be used for the spring effect. For instance, the shapes of the grooves may be (or may resemble) substantially rectangular grooves, substantially circular grooves, substantially triangular grooves, substantially polygonal grooves, substantially elliptic grooves, grooves having bent or curved walls (especially with any arbitrary curvature), grooves with a tapering shape, grooves having a substantially meandering shape and the like. According to some embodiments, which may be combined with other embodiments described herein, the shape of the one or more groove(s) may depend on manufacturing factors, such as fast formability, shape of the used tools, duration of the formation process, and the like.

Figure 13:
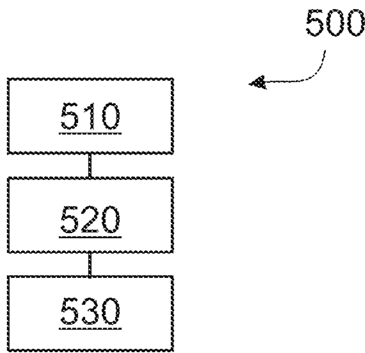
FIG. 13 illustrates a schematic flow chart of a method for building a wind turbine blade according to embodiments of the present disclosure.

FIG. 13 illustrates a flow chart of a method 500 for building a wind turbine blade shell. Typically, the wind turbine blade shell includes (in its mounted condition) a first element 200 and a second element 300. According to some embodiments, which may be combined with other embodiments described herein, the first element and the second element may be a first element and a second element as described in embodiments herein. Especially, the first element 200 has a first mating surface 201 and the second element 300 has a second mating surface 301. Typically, the first and second mating surface are adapted for mating with each other. More typically, the first and second mating surfaces have an orientation in a first direction 401, as explained in detail above.

In block 510, the method 500 includes forming one or more grooves 310 into the second element 300. The one or more grooves may be formed in any suitable way into the second element 300. For instance, the one or more grooves may be cut into the second element 300, may be milled into the second element 300, or may be formed together with the second element (such as during production of the second element, e.g. by casting, additive manufacturing, injection molding and the like).

According to embodiments described herein, the one or more grooves 310 in the second element 300 are able to generate a spring effect for the second element. Additionally, or alternatively, the one or more grooves provide a spring effect or enable the second element to act substantially as a spring, or enable the second element to provide a spring effect (especially during assembly of the blade shell). According to embodiments described herein, the spring effect may be generated or may substantially be effective in a second direction 402 substantially perpendicular to the first direction 401. According to some embodiments, the spring effect being generated or being effective in the second direction may be understood in that the force exerted by the element having a spring effect acts substantially in the second direction.

In block 520, the method 500 includes placing the first element 200 and the second element 300 adjacent to each other, e.g. in a blade shell mold in some embodiments. Typically, when placing the first element 200 and the second element, the first mating surface 201 of the first element 200 and the second mating surface 301 of the second element 300 are facing each other (as exemplarily shown in FIGS. 5 to 9). According to some embodiments, a gap may appear between the first element 200 and the second element 300, when placing the first and second element adjacent to each other.

According to some embodiments, the first mating surface 201 and the second mating surface 301 are brought in an abutting condition, when placing the first and second element as far as possible (hindered e.g. by production tolerances, deviations of the geometry, irregularities on the mating surfaces, temperature conditions, and the like).

In block 530 of the method 500, the gap between the first element 200 and the second element 300 in the second direction 402 is closed by pressing the first mating surface 201 and the second mating surface 301 together. According to some embodiments, which may be combined with other embodiments described herein, bringing the first and second mating surfaces in abutting condition may take place in block 530, especially by pressing the mating surfaces together. Whether the abutting condition may be realized in block 520 or block 530 may depend on the placement of the first and second element, the material choice for the first and second elements, the production tolerances, the production accuracy, the blade shell mold, the age of the blade shell mold, the material of the blade shell mold, the temperature and the like.

According to some embodiments, pressing the first mating surface 201 and the second mating surface 301 together may include compressing the second element and, optionally, the first element. Typically, the method according to some embodiments described herein may include finishing the compressing force on the second element, and, more typically, allowing the second element to expand (especially due to the spring effect). In some embodiments, the expansion of the second element after compression may fill a gap between the first element and the second element.

According to some embodiments, the gap may be closed by the generated spring effect and the force exerted by the spring-like acting element (i.e. the second element). Typically, closing the gap 450 includes closing the gap 450 by using the spring effect provided by the one or more grooves 310. It may be understood that the spring effect provided by the formation of the grooves in the second element helps closing the gap in a variety of different scenarios regarding the dimensions of the elements of the blade shell. For instance, the guidelines for the dimensions of the used elements for the blade shell may be less strict since the spring effect provided by the second element is able to balance non-fitting dimensions. Also, the spring effect helps keeping the elements at place by exerting a respective force.

According to embodiments described herein, the method for building a blade shell of a wind turbine blade, and the assembly for a blade shell of a wind turbine blade improve the manufacturability of the blade shell, especially spares work steps, and lower the guidelines for the dimensions (which, in turn, may make the production process less expensive). Furthermore, the quality of the blade shell can be improved by the method and the assembly according to embodiments described herein. By improving the quality of the blade shell, cycle times and repairs of the wind turbine blade can be reduced. The quality of the wind turbine blade may also be improved by an improved strength of the blade shell produced according to embodiments described herein especially when compared to existing blade shells, or blade shells produced by known methods.

Exemplary embodiments of a method for building a blade shell of a wind turbine, an assembly for a blade shell of a wind turbine, and a wind turbine are described above in detail. The systems and methods are not limited to the specific embodiments described herein, but rather, elements of the systems and/or steps of the methods may be utilized independently and separately from other elements and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

Embodiments of the present invention have been described above with reference to block diagrams and flowchart illustrations of methods, assemblies and wind turbines. It will be understood that each block of the block diagrams and flowchart illustrations, and combinations of blocks in the block diagrams and flowchart illustrations, respectively, can be implemented by various means including computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art.

REFERENCE NUMBERS wind turbine 100
nacelle 102
tower 104
rotor 106
rotor blades 108
hub 110
root of rotor blade 111
tip of rotor blade 112
cross-section 113
shear web 114
blade shell mold 115
first element 200
first mating surface 201
second element 300
second mating surface 301
grooves 310
cross-directional grooves 311
first direction 401
second direction 402
height of the second element 403
first direction size of groove 404
second direction size of groove 405
gap 450
method 500
method blocks 510-530

The invention claimed is:

1. A blade shell assembly configured for forming a wind turbine blade shell, the blade shell assembly comprising:
- a first element configured as a main spar element for placement along a length of the blade shell, the first element having a first mating surface along a longitudinal side thereof;
- a second element configured as a core material for placement along the length of the blade shell adjacent the first element, the second element having a second mating surface along a longitudinal side thereof opposed to the first mating surface;
- wherein the first mating surface and the second mating surface are configured to butt against each other in an assembled state of the wind turbine blade shell;
- the second element comprising a spring effect section having one or more grooves displaced from the second mating surface such that the spring effect section is compressible and expandable in a cross-sectional direction of the second element substantially perpendicular to the second mating surface; and
- wherein the second element is configured for placement adjacent the first element in a blade shell mold with the first and second mating surfaces transverse to the blade shell mold and opposed to each other and with the spring effect section in a compressed state, wherein the spring effect section may remain in the compressed state in abutting engagement with the first mating surface or expand such that the second mating surface moves across a gap between the first and second elements and into abutting engagement with the first mating surface.

2. The blade shell assembly according to claim 1, wherein the one or more grooves extend in a first direction of the second element substantially parallel to the second mating surface or the first mating surface.

3. The blade shell assembly according to claim 1, wherein the one or more grooves comprise one of a substantially tapering shape, a substantially rectangular shape, or substantially an open ellipse shape.

4. The blade shell assembly according to claim 1, further comprising a blade shell mold for receipt of the first element and the second element and wherein the blade shell mold is configured for infusion of the first element and the second element with a resin material in the blade shell mold.

5. A wind turbine blade, formed with the blade shell assembly according to claim 1.

6. A method for building a wind turbine blade shell having a first element configured as a main spar element disposed along a length of the blade shell with a first mating surface defined along a longitudinal side thereof and a second element configured for placement along the length of the blade shell adjacent the first element with a second mating surface along a longitudinal side thereof opposed to the first mating surface, the method comprising:

forming a spring effect section in the second element by defining one or more grooves into the second element displaced from the second mating surface, the spring effect section compressible and expandable in a cross-sectional direction of the second element substantially perpendicular to the second mating surface;

placing the first element and the second element adjacent to each other in a blade shell mold with the first and second mating surfaces transverse to the blade shell mold and facing each other, wherein the spring effect section of the second element is in a compressed state; and closing a gap between the first element and the second element by releasing the spring effect section from the compressed state such that the second mating surface moves across the gap into abutting engagement with the first mating surface.

7. The method according to claim 6, further comprising infusing a resin material into the blade shell mold.

8. The method according to claim 6, wherein the one or more grooves are formed to extend in a first direction within the second element substantially parallel to the second mating surface or the first mating surface.

* * * * *